(12) United States Patent
Siciliano

(10) Patent No.: US 10,967,803 B1
(45) Date of Patent: Apr. 6, 2021

(54) MATERIAL TRANSPORT CAGE AND METHODS OF USING THE SAME

(71) Applicant: Richard A. Siciliano, Schenectady, NY (US)

(72) Inventor: Richard A. Siciliano, Schenectady, NY (US)

( * ) Notice: Subject to any disclaimer, the term of this patent is extended or adjusted under 35 U.S.C. 154(b) by 0 days.

(21) Appl. No.: 15/814,334

(22) Filed: Nov. 15, 2017

Related U.S. Application Data

(60) Continuation of application No. 15/075,335, filed on Mar. 21, 2016, now Pat. No. 9,849,838, which is a division of application No. 14/205,321, filed on Mar. 11, 2014, now abandoned.

(51) Int. Cl.
  *B60R 7/04* (2006.01)
  *B65D 21/02* (2006.01)
  *B62B 3/16* (2006.01)

(52) U.S. Cl.
  CPC ............. *B60R 7/043* (2013.01); *B62B 3/16* (2013.01); *B65D 21/0212* (2013.01)

(58) Field of Classification Search
  CPC ....... B60R 7/043; B65D 21/0212; B62B 3/14; B62B 3/16; B62B 3/165
  See application file for complete search history.

(56) References Cited

U.S. PATENT DOCUMENTS

| | | | |
|---|---|---|---|
| 4,905,855 A | 3/1990 | Getzschman et al. | |
| 4,964,529 A | 10/1990 | Houston | |
| 5,289,941 A | 3/1994 | Blankenburg et al. | |
| 5,366,124 A | 11/1994 | Dearborn, IV | |
| 5,385,263 A | 1/1995 | Kirk et al. | |
| 5,799,849 A | 9/1998 | Beer et al. | |
| 5,876,049 A | 3/1999 | Spear et al. | |
| 6,042,130 A | 3/2000 | Souza | |
| 6,149,040 A | 11/2000 | Walker | |
| 6,302,291 B1 | 10/2001 | McCleerey | |
| 6,338,518 B1 | 1/2002 | D'Annunzio et al. | |
| 6,863,198 B1 | 3/2005 | Darby | |
| 6,874,667 B2 | 4/2005 | Dykstra et al. | |
| 7,017,741 B1 | 3/2006 | Williamson | |
| 7,201,383 B2 | 4/2007 | Gibby | |

(Continued)

FOREIGN PATENT DOCUMENTS

| | | | | |
|---|---|---|---|---|
| DE | 3629027 A | 3/1988 | | |
| DE | 4229755 A1 * | 3/1994 | ............... | A45C 5/00 |
| GB | 2 234 494 A | 6/1991 | | |

*Primary Examiner* — Katy M Ebner
(74) *Attorney, Agent, or Firm* — GFD Patents LLC; Gerald F. Dudding

(57) ABSTRACT

A stackable transportable apparatus and method for storing or transporting at least one cylinder, having first and second lateral sides, a front side, a rear side, a bottom side and an opening in the top. The opening in the top and the bottom side are in a plane that is orthogonal to the longitudinal axis. Adjacent sides of each container are operably coupled to form a wall of the container. The wall includes front and rear proximal edges, and front and rear distal, edges. The front and rear proximal edges are closer to the center of a vehicle, by which the container is transported, than the front and rear distal edges. A top portion of the front side of the wall of the container, and the front proximal and distal edges have a plurality of open slot grooves.

6 Claims, 15 Drawing Sheets

(56) References Cited

U.S. PATENT DOCUMENTS

| | | | | |
|---|---|---|---|---|
| 7,628,407 B1 | * | 12/2009 | Krowl | B62B 1/12 |
| | | | | 266/48 |
| 8,814,179 B1 | * | 8/2014 | McCormick | B62B 19/02 |
| | | | | 280/10 |
| 2011/0186458 A1 | * | 8/2011 | Schiessl | B65D 21/0212 |
| | | | | 206/457 |

* cited by examiner

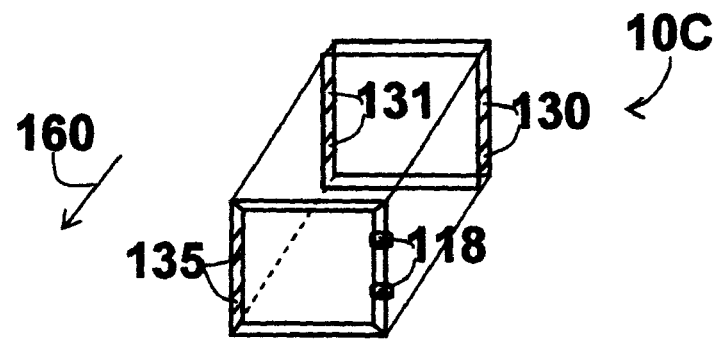
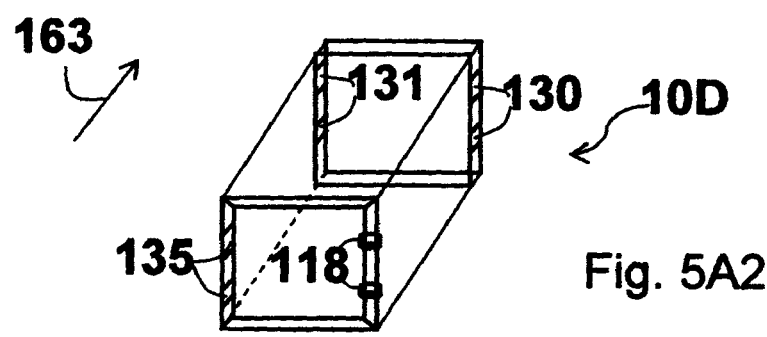
Fig. 5A2
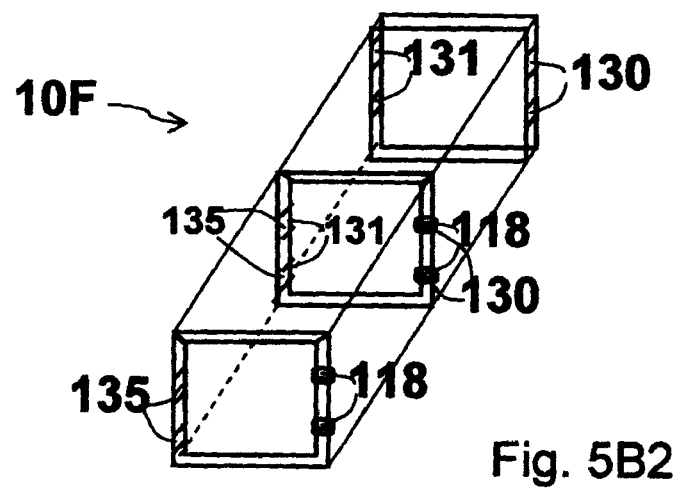
Fig. 5B2

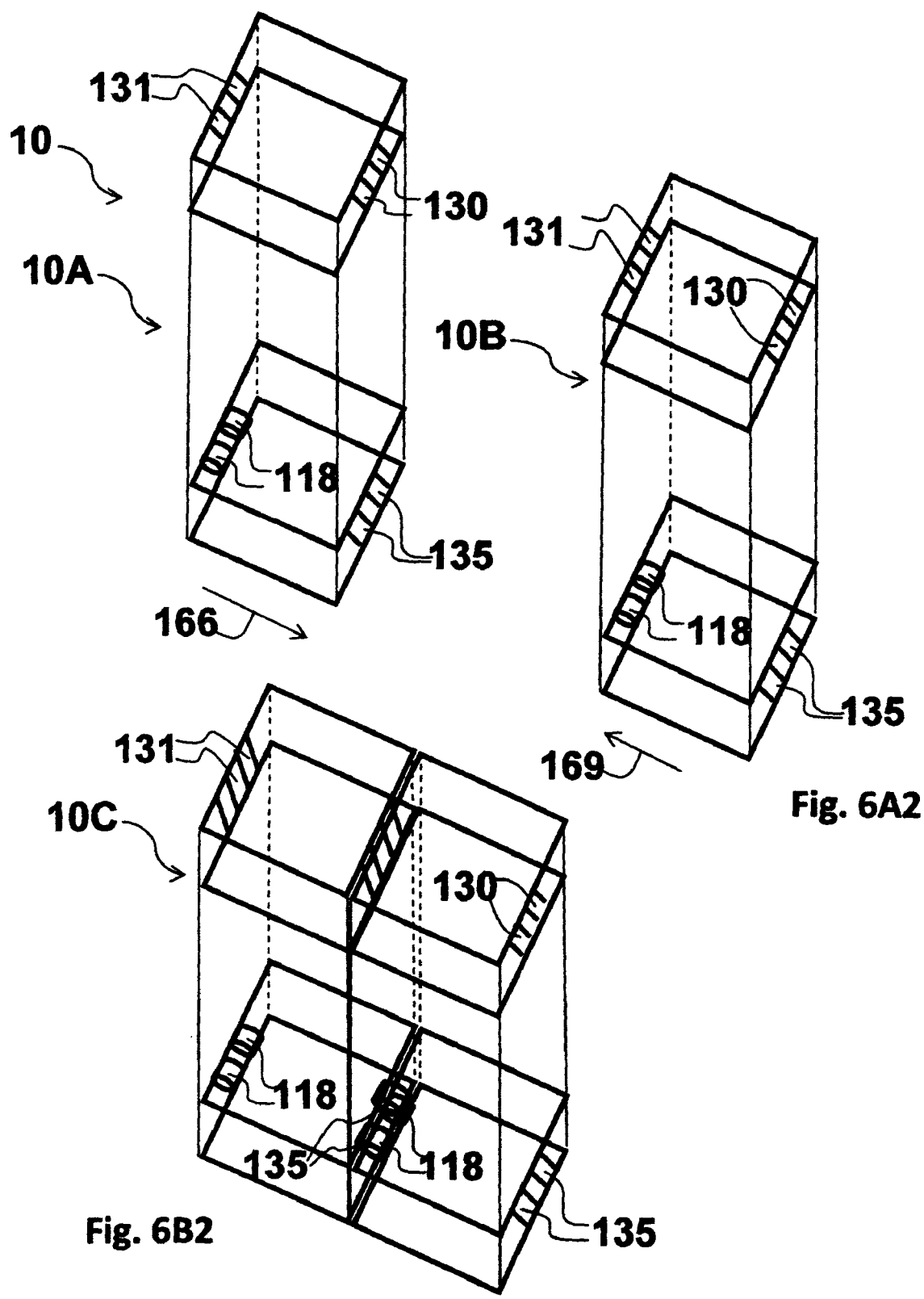

MATERIAL TRANSPORT CAGE AND METHODS OF USING THE SAME

1. FIELD OF THE INVENTION

The present invention relates generally to devices for holding items safely in a car and methods of using the same. More specifically, the present invention relates to a seat belt restrainable container and methods of using the same.

2. BACKGROUND

Vehicles, such as cars or light trucks, may be used to transport items, e.g., in their passenger compartments, trunks, truck beds, or truck floors. The items may be thrown about due to unexpected movement of the vehicles used to transport the items. Such unexpected movement may be due to rough driving habits, road conditions, accidental collisions, or adverse driving conditions due to the weather. Therefore, there is a need for holders and methods for transporting items in vehicles.

One objective of the material transport cage is to provide an inexpensive, light weight, yet durable, and long lived, reusable, restrainable, stackable container that can store, secure and protect both fragile objects, such as bottles, wine, soft drink bottles, and the like, cans, milk cartons, etc., and protect passengers in vehicles from injury due to the objects being thrown about in case of sudden stops during transport.

A second objective of the material transport cage is to securely hold a propane canister in a restrainable container so it can be safely transported.

A third objective is to provide a stable container that can be attached to a car via the seat belts in any of the passenger seats during transport.

A fourth objective is to provide a holder that can be easily moved and manipulated by one person both when being placed in a vehicle and while being moved over sand, gravel, concrete or similar flat terrain.

A fifth objective is to provide a safely stackable container with a locking lid that can be securely held in the back of a truck or similar transportation vehicle.

A sixth objective is to provide a stackable container for holding small propane canisters, eg., having a less than or equal to 25 pound capacity, that can be stored.

SUMMARY OF THE INVENTION

A first aspect of the present invention provides a stackable apparatus for storing or transporting at least one cylinder, comprising: a hollow container having the shape of a cuboid (six (6) rectangular sides). The container has first and second lateral sides, a front side, a rear side, a bottom side and an opening in the top. The lateral sides, the front and the rear sides run along a longitudinal axis of the container. The opening in the top and the bottom side are in a plane that is orthogonal to the longitudinal axis. The top portions of the first and second lateral sides, a top portion of the front side, and a top portion of the rear side are defined as being adjacent to the top portions of the first and second lateral sides, the top portion of the front side, and the top portion of the rear side. The bottom portions of the first and second lateral sides, a bottom portion of the front side, and a bottom portion of the rear side are defined as being adjacent to the bottom portions of the first and second lateral sides, the bottom portion of the front side, and the bottom portion of the rear side. The adjacent sides of each container are operably coupled to form a wall of the container. The wall includes front and rear proximal edges, and front and rear distal edges. The front and rear proximal edges are defined as being closer to a longitudinal axis running through the center of a vehicle, by which the container is transported, than the front and rear distal edges. The front and rear proximal edges are formed by coupling the first lateral side to the front and rear sides, respectively, and the front and rear distal edges are formed by coupling the second lateral side to the front and rear sides respectively. The top portion of the front side of the wall of the container, and the front proximal and distal edges have a plurality of open slot grooves.

BRIEF DESCRIPTION OF THE FIGS

The features of the invention are set forth in the appended claims. The invention itself, however, will be best understood by reference to the following detailed description of an illustrative embodiment when read in conjunction with the accompanying drawings, wherein:

Figure 5A:
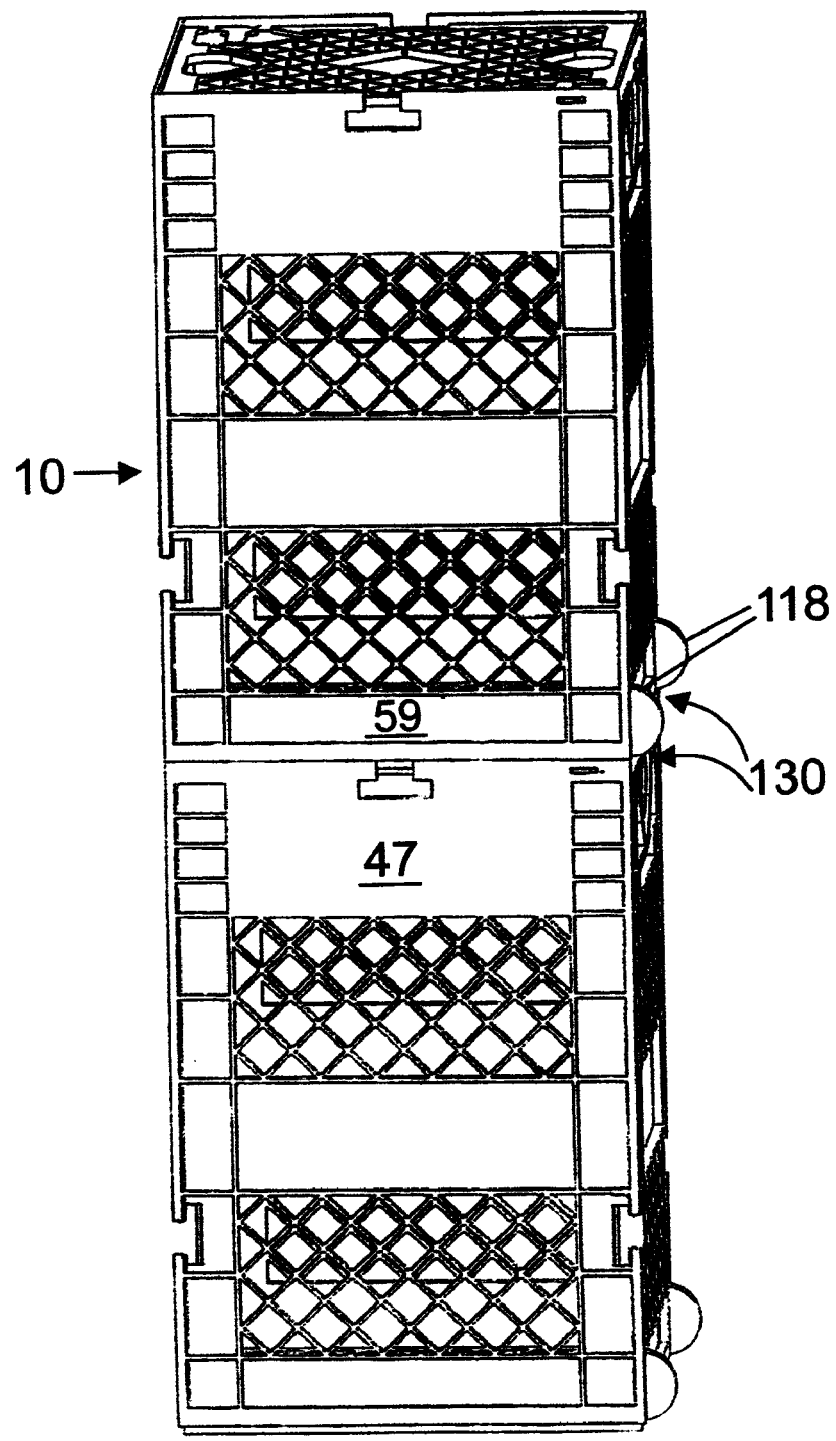
FIG. 5A depicts the apparatus vertically stacked, in accordance with embodiments of the present invention.
Figure 6A:
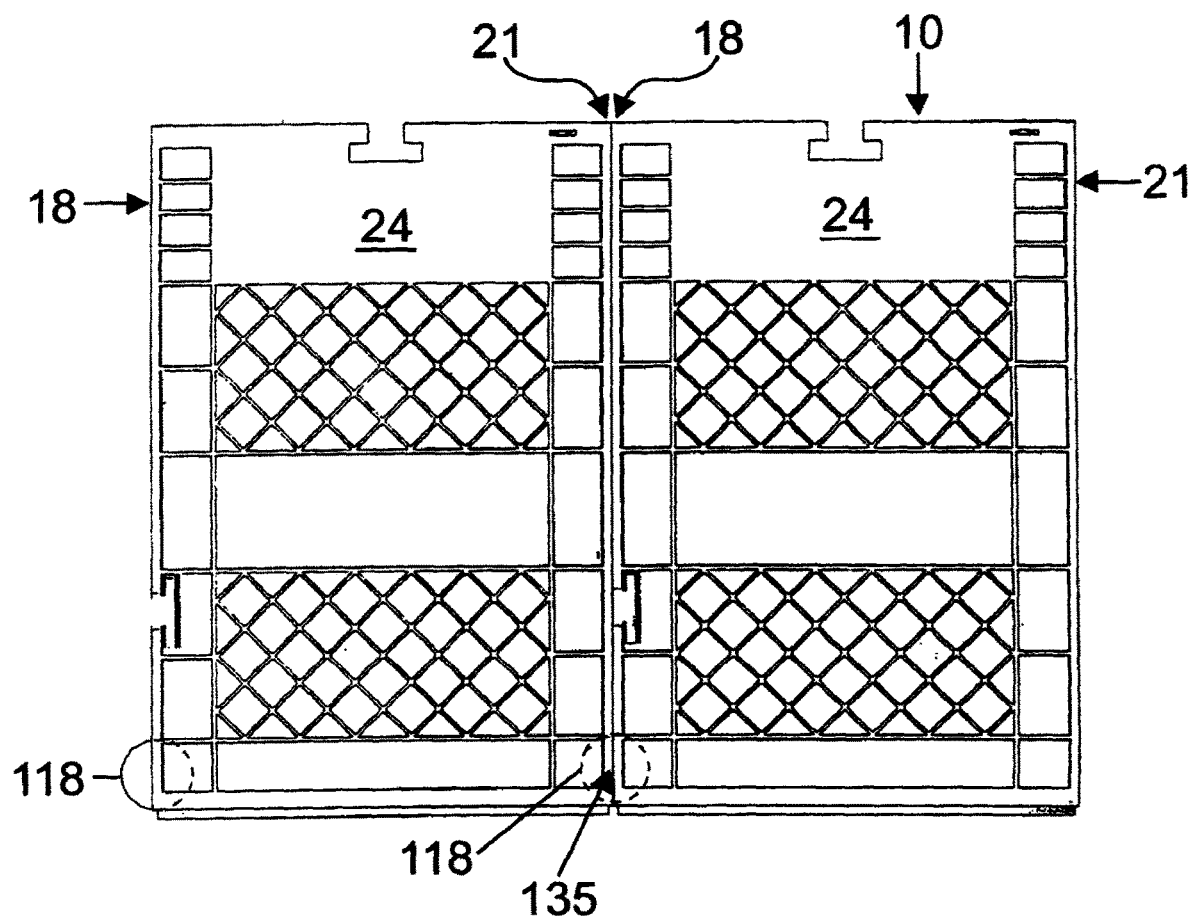
Figure 7:
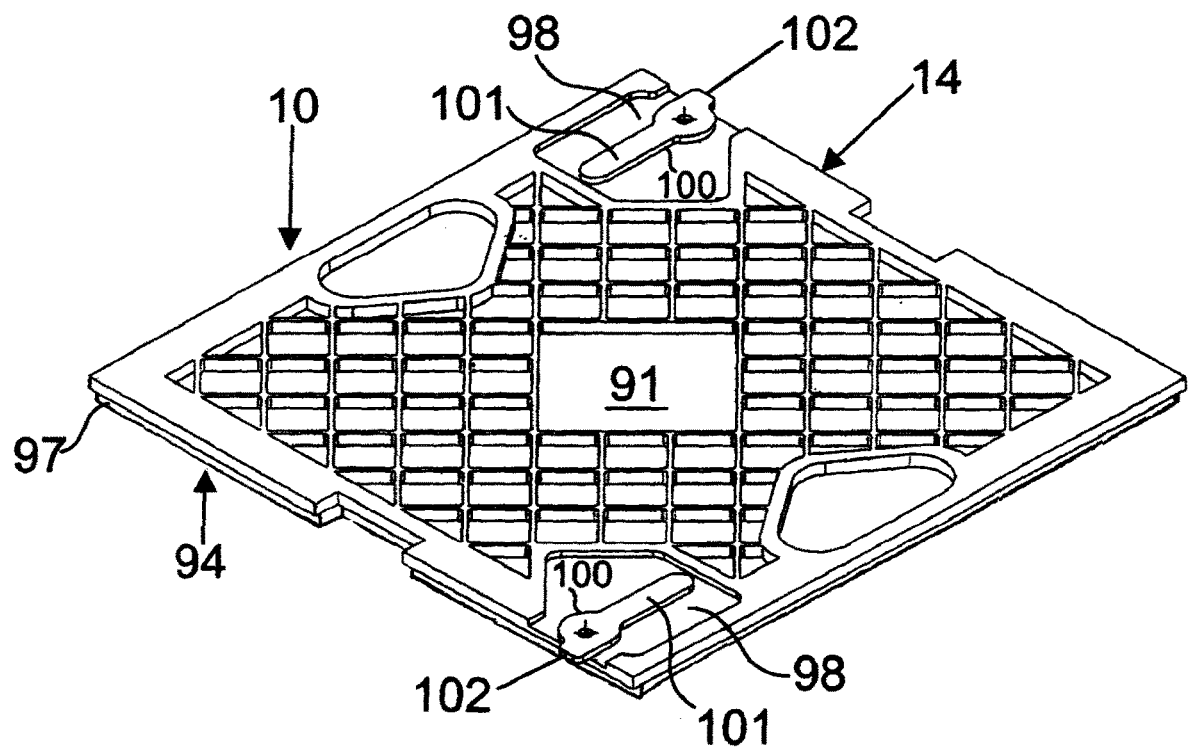
Figure 8:
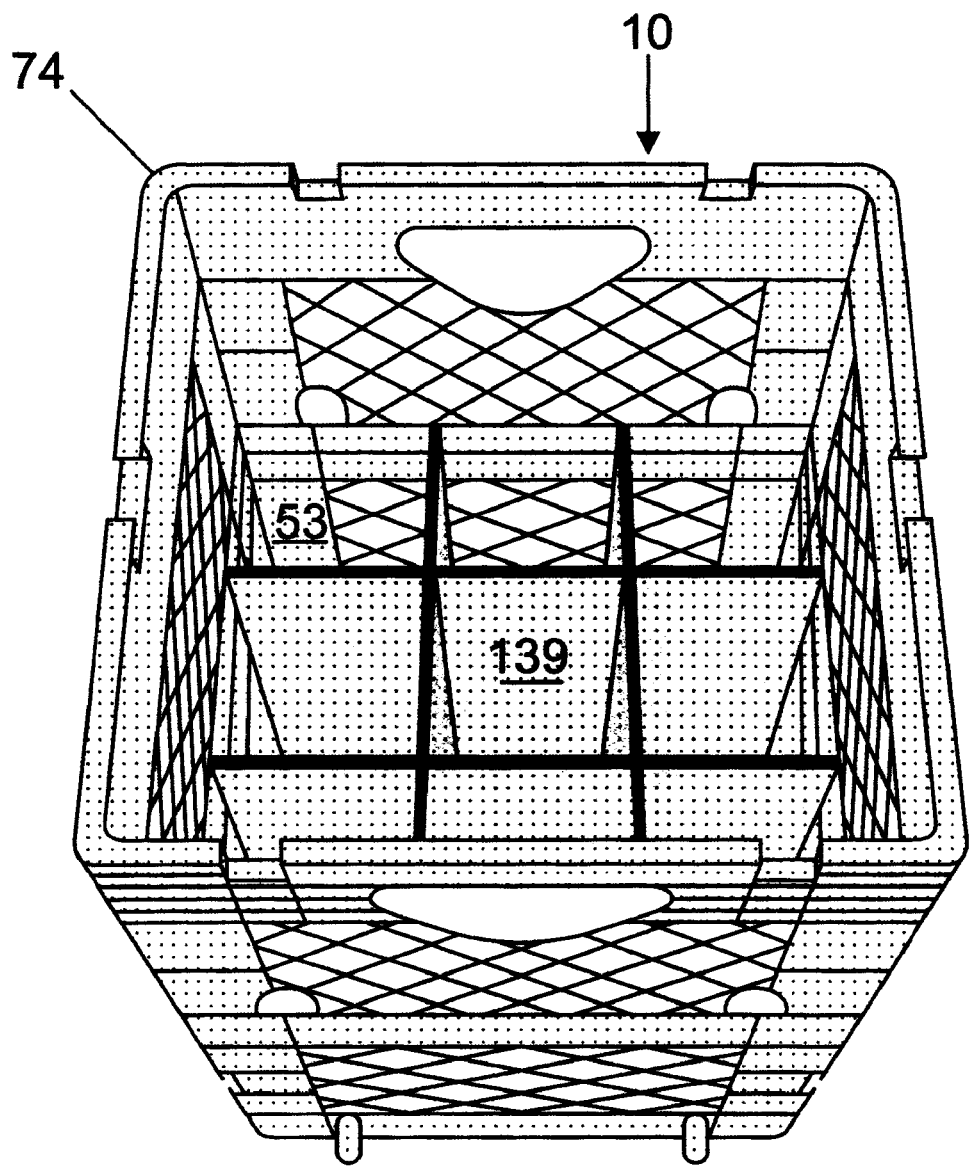
Figure 9:
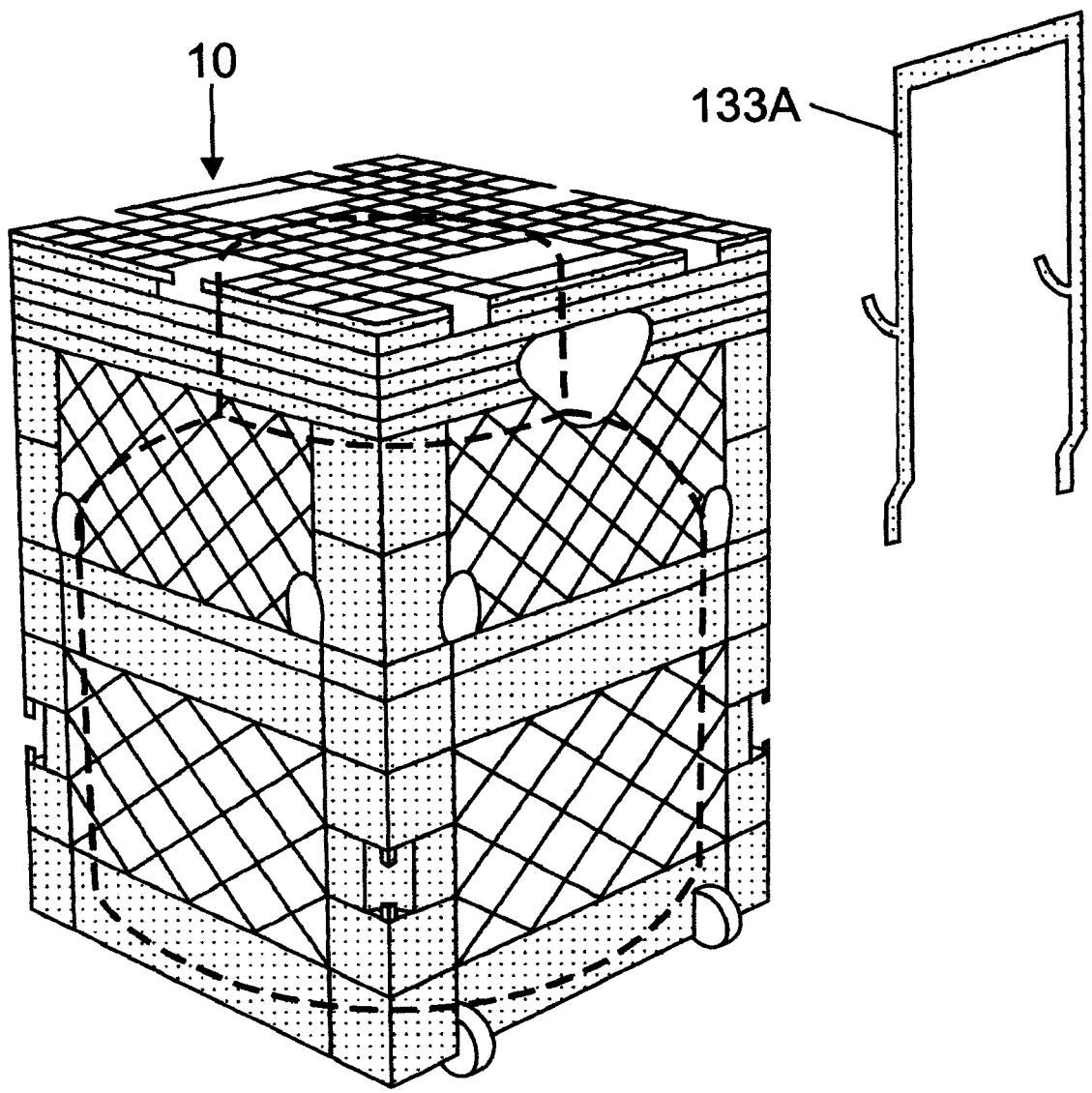
Figure 10:
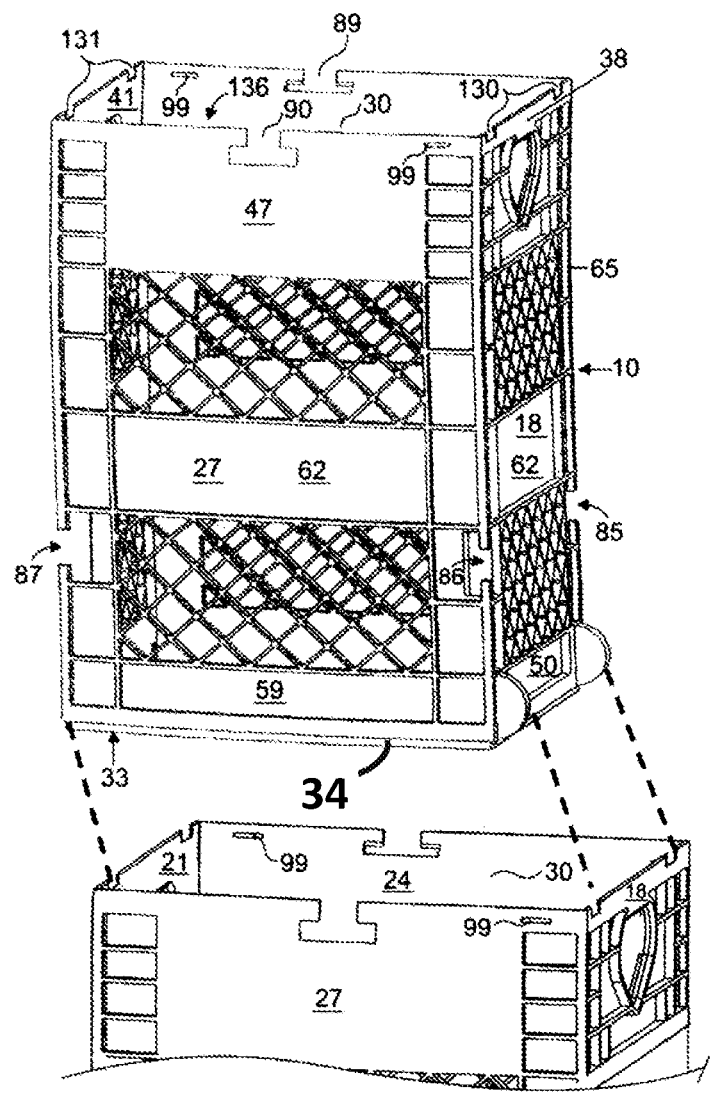
Figure 11:
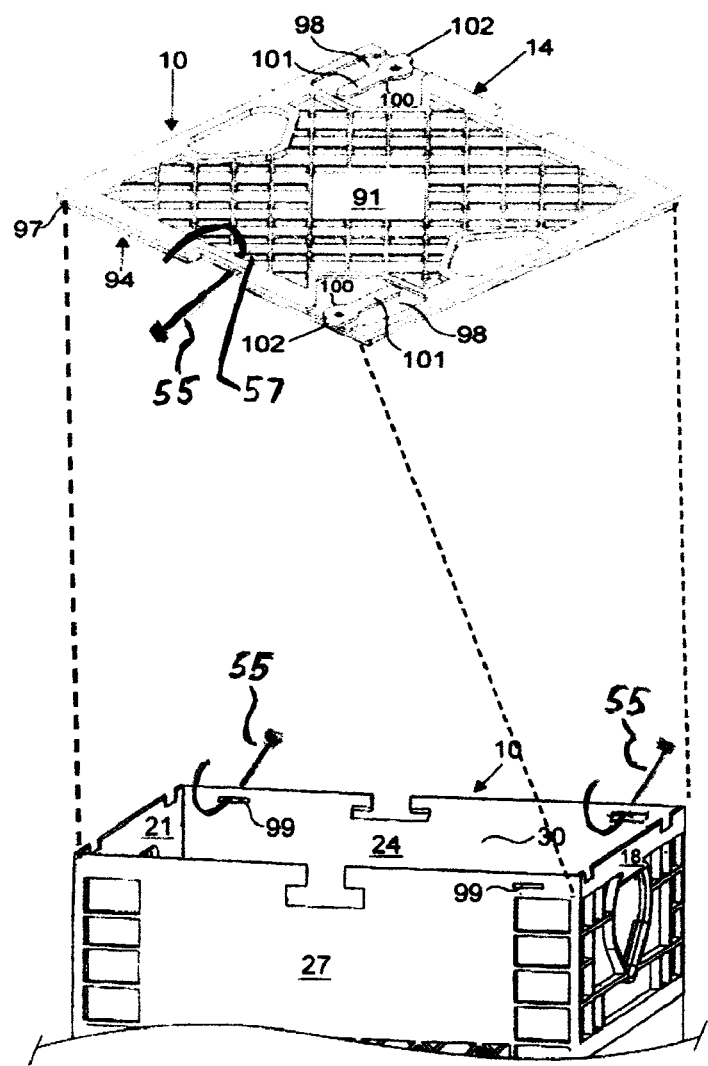

FIG. 5A2 depicts the apparatus before being vertically stacked, in accordance with embodiments of the present invention;

FIG. 5B2 depicts the apparatus after being vertically stacked, in accordance with embodiments of the present invention;

FIG. 6A depicts the apparatus horizontally stacked, in accordance with embodiments of the present invention;

FIG. 6A2 depicts the apparatus before being horizontally stacked, in accordance with embodiments of the present invention;

FIG. 6B2 depicts the apparatus after being horizontally stacked, in accordance with embodiments of the present invention;

FIG. 7 depicts the removable lid and one embodiment of its locking mechanism, in accordance with embodiments of the present invention;

FIG. 8 depicts the apparatus with a optional interlocking spacer, in accordance with embodiments of the present invention;

FIG. 9 depicts one embodiment of a handle which can be operably attached to the first lateral side, in accordance with embodiments of the present invention;

FIG. 10 depicts a detailed view of the apparatus being vertically stacked, in accordance with embodiments of the present invention; and FIG. 11 depicts a detailed view of the lid being operably coupled to the top of the apparatus, in accordance with embodiments of the present invention.

DETAILED DESCRIPTION OF EMBODIMENTS OF THE INVENTION

I. Definitions

As used herein, unless otherwise defined, the singular forms "a", "an", and "the" include plural references unless the context clearly dictates otherwise. Thus, for example, reference to "a container" includes a plurality of such containers, and so forth.

As used herein, unless otherwise defined, the term "operably coupling" or "operably coupled" or "operably joined" or "operable coupler" is defined as forming a mechanical, physical union wherein the components being joined may freely rotate on the coupling, e.g., about an axle, or be slidably extendable or slidably retractable, e.g., sleeves of a telescopic handle.

Figure 1:
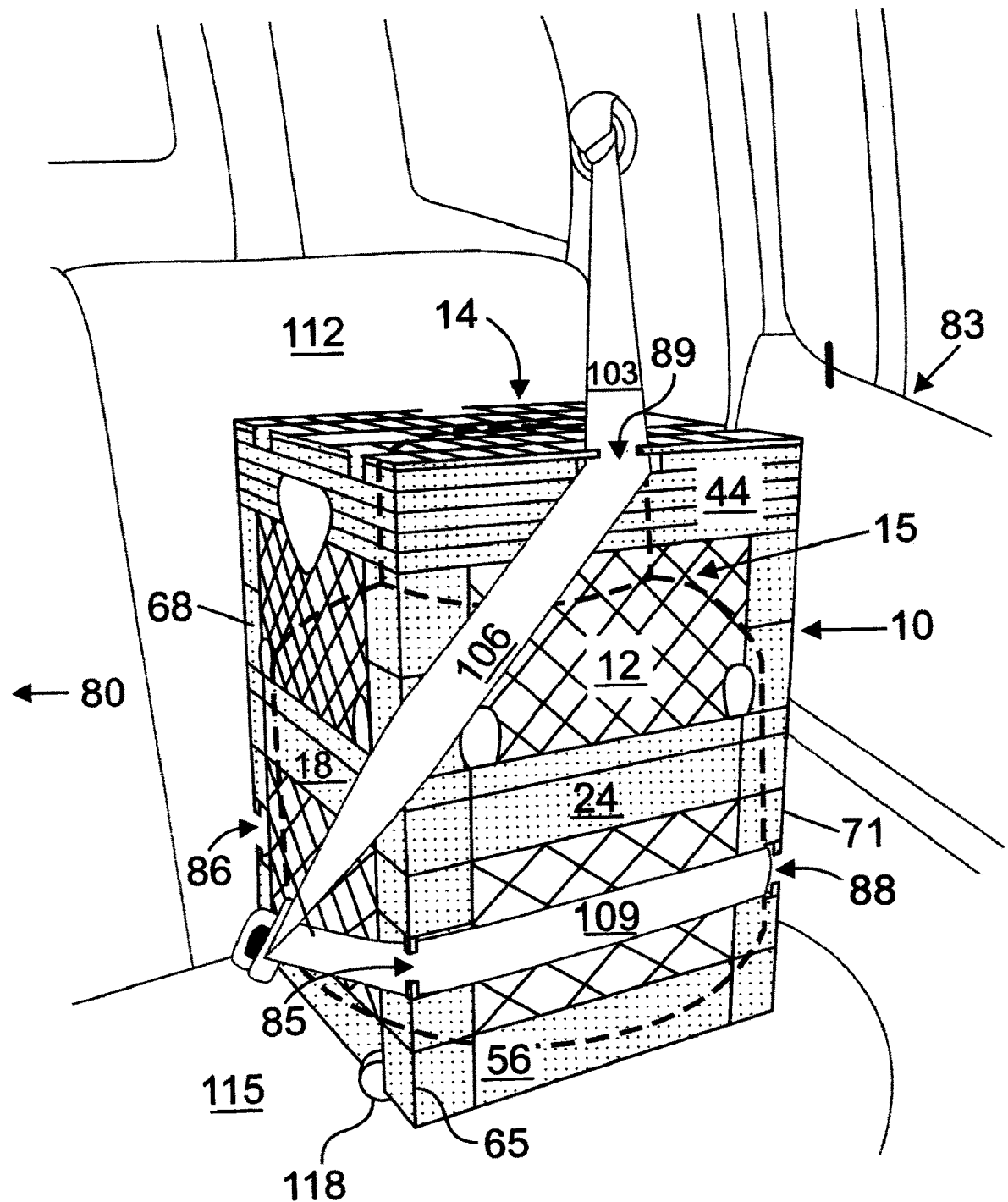
FIG. 1 depicts a material transport cage strapped into the driver's side rear passenger seat of an automobile with the first lateral side facing the interior of the auto while the second lateral side faces the exterior of the auto, in accordance with embodiments of the present invention.

Referring to FIGS. 1 and 2 as used herein, unless otherwise defined, the terms 'distal edge" and "proximal edge" refer to opposite edges of a wall 62. A front proximal edge 65 and a rear proximal edge, 68 are defined as being closer to a center 80 of a vehicle 83, by which a container 15 is transported, than a front distal edge 71 and a rear distal edge, 74.

FIG. 1 depicts an elevation view of the stackable transportable apparatus 10 in a vehicle 83, e.g., an automobile, equipped with a seat belt 103, having a shoulder portion 106 and a waist portion 109. The container 15 has been placed against a first surface 112 of a passenger seat 115 of the vehicle 83, so that a bottom side 33 of the container 15 rests on the passenger seat 115. The shoulder portion 106 of the seat belt 103 has been extended diagonally from a wall of the vehicle 83 above the container 15 across a front face 24 of the container 15 and is extended through an open slot groove 89 in a top portion 44 of the front side 24 and the waist portion 109 has been extended through an open slot groove 85, and an open slot groove 88 in the front proximal and front distal edges 65, 71 of the wall 62 of the container 15.

The stackable transportable apparatus 10 may have a first lateral side 18 and a second lateral side 21, the front side 24, a rear side 27, a removable lid 14, and the bottom side 33. The lateral sides 18, 21 and the front side 24 and rear side 27 run along a longitudinal axis 35 of the container 15, illustrated in FIG. 3, infra. An opening in the top 30 and the bottom side 33 are in a plane that is orthogonal to the longitudinal axis 35. A top portion 38 of the first lateral side 18, a top portion 41 of the second lateral side 21, the top portion 44 of the front side 24, and a top portion 47 of the rear side 27 are defined as being adjacent to the top portions 38, 41 of the first and second lateral sides 18, 21, the top portion 44 of the front side 24, and the top portion 47 of the rear side 27. A bottom portion 50 of the first lateral side 18, a bottom portion 53 of the second lateral side 21, a bottom portion 56 of the front side 24, and a bottom portion 59 of the rear side 27 are defined as being adjacent to the bottom portions 50, 53 of the first and second lateral sides 18, 21, the bottom portion 56 of the front side 24, and the bottom portion 59 of the rear side 27. The adjacent sides 18, 21, 24, and 27, of each container are operably coupled to form a wall 62 of the container 15.

In one embodiment, the at least one open slot grooves 85, 88 in each of the front proximal 65 and front distal edges 71 of the first lateral side 18 and second lateral side 21 of the wall 62 of each container 15 of at least one cylinder 12 is a minimum of about 4.5 inches from the bottom portions 50, 53 of the first lateral side 18 and second lateral sides 21, the bottom portion 56 of the front side 24, and the bottom portion 59 of the rear side 27 of the wall 62 of the container 15.

In one embodiment, a depth of the cavity 136 inside the container 15 extends at least about 17 to 19 inches from the top portion 38, 41 of the first lateral side 18, the top portion 41 of the second lateral side 21, the top portion 44 of the front side 24, and from the top portion 47 of the rear side 27 of the wall 62 of the container 15, to the bottom portion 50 of the first lateral side 18, the bottom portion 53 of the second lateral side 21, the bottom portion 56 of the front side 24, and to the bottom portion 59 of the rear side 27 of the wall 62 of the container 15.

Figure 3:
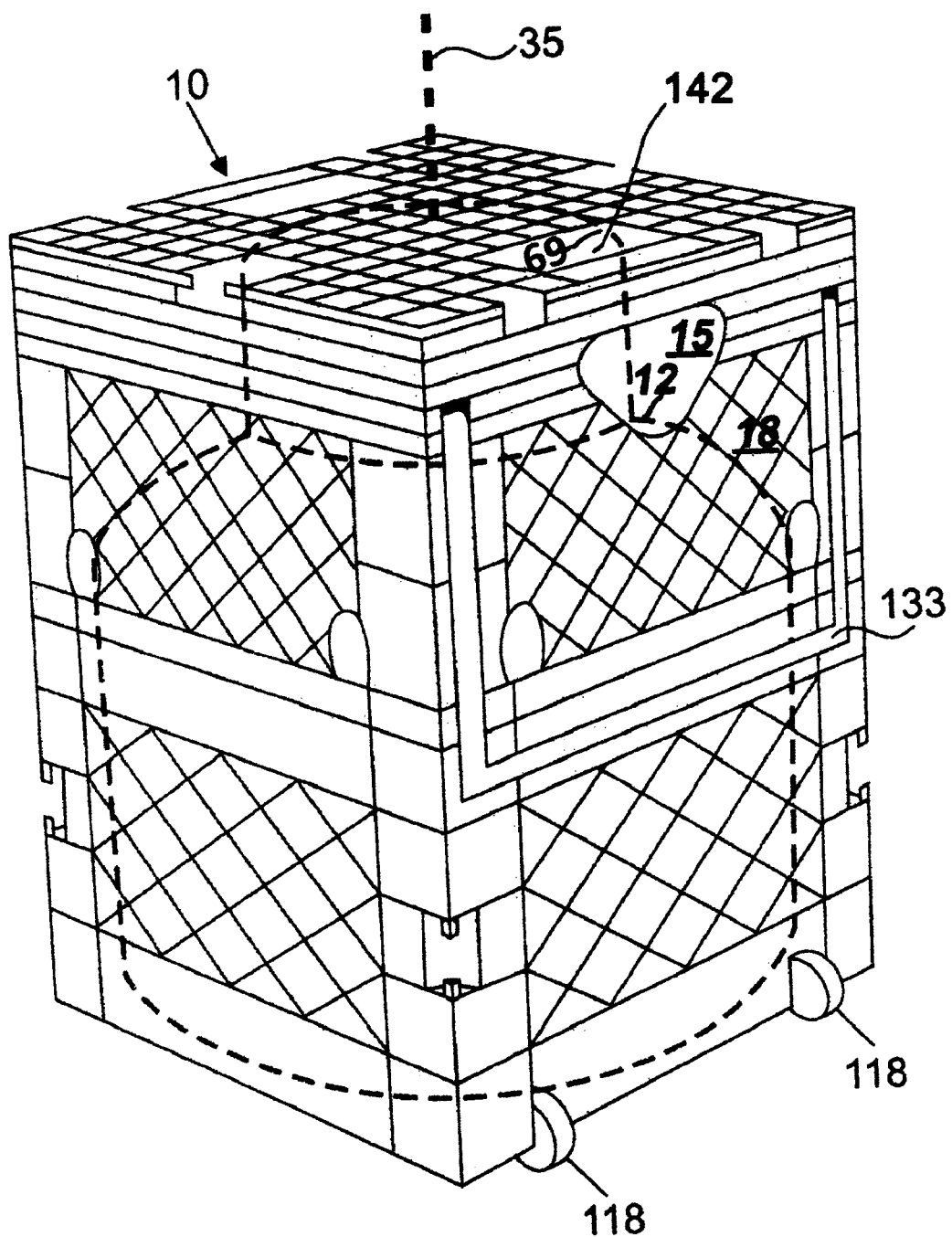
FIG. 3 depicts an elevation view of the material transport cage, in accordance with embodiments of the present invention.

In another embodiment a method of transporting at least one cylinder 12, as shown in FIG. 3, comprises the stackable apparatus 10, at least one cylinder 12 having a valve 142 extending from a neck end 69 of the cylinder 12, inserting the at least one cylinder 12 through the opening in the top 30, so the length of the cylinder 12 and the valve 142 do not exceed a depth of the cavity 136 inside the container 15, extending at least about 17 to 19 inches from the top portions 38, 41 of the first and second lateral sides 18, 21, from the top portion 44 of the front side 24, and from the top portion 47 of the rear side 27 of the wall 62 of the container 15 to the bottom portions 50, 53 of the first and second lateral sides 18 21, to the bottom portion 56 of the front side 24, and to the bottom portion 59 of the rear side 27 of the wall 62 of the container 15. The length from each adjacent edge of the container 15 is at least about 12 inches, placing the stackable apparatus 10 on the seat 115 of the vehicle 83, so that the bottom side 33 of the container 15 rests on the passenger seat 115, and extending the seat belt 103 around the container 15, so that the shoulder portion 106 of the seat belt 103 extends diagonally from the wall of the vehicle 83 above the container 15 through the open slot groove 89 in the top portion 44 of the front side 24 of the container 15; and so that the waist portion 109 extends through the slotted openings 85, 88 in the front proximal edge 65 and the front distal edge 71 of the wall 62 of the container 15.

Figure 2A:
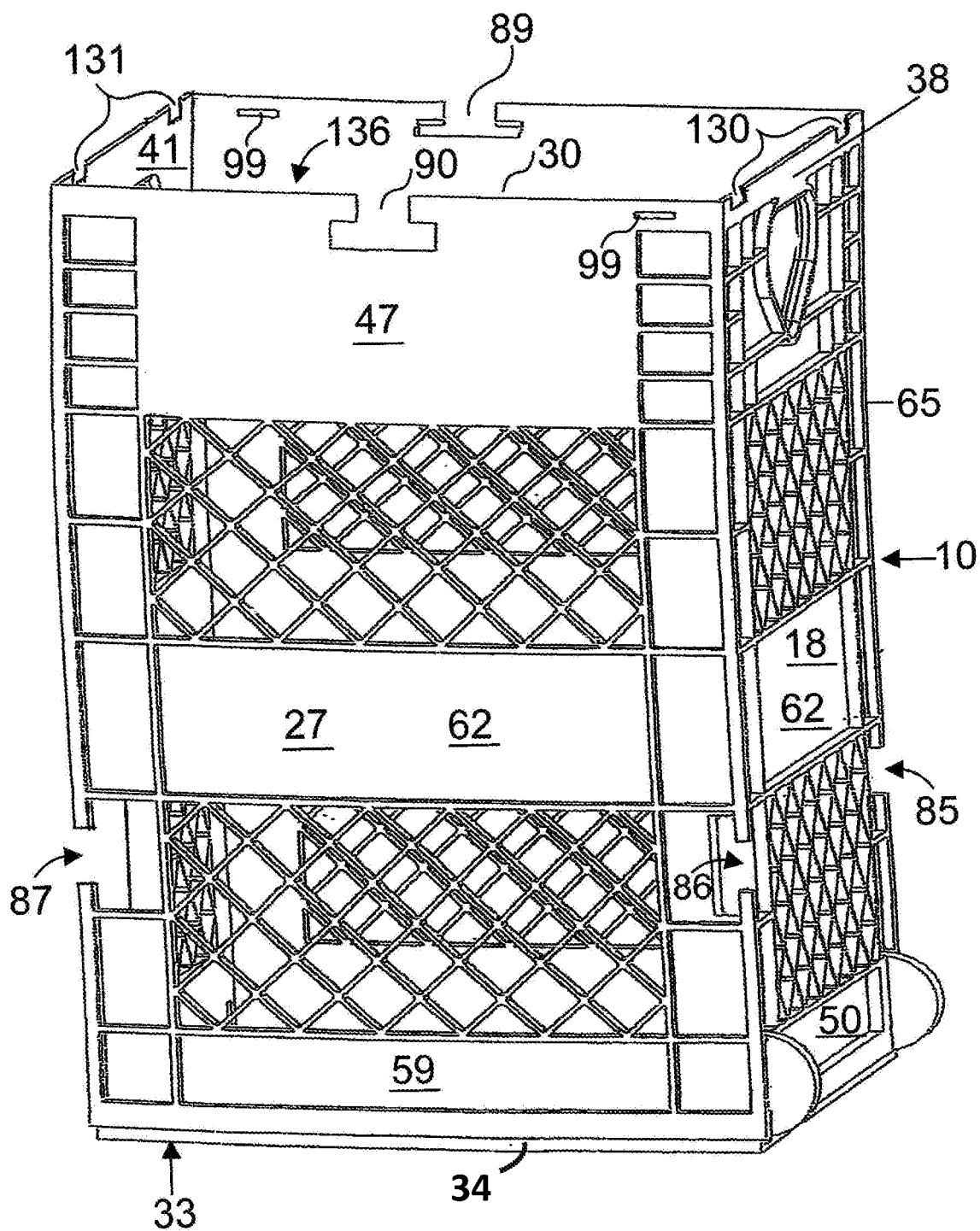
FIG. 2A depicts the container in the vertical upright position with the rear side proximal to the viewer, in accordance with embodiments of the present invention.

FIG. 2A depicts the apparatus 10 in the vertical upright position with the rear side 27 proximal to the viewer. The side elevation view of the stackable apparatus 10 for storing or transporting at least one cylinder 12, comprising a pair of wheels 118 operably coupled to the bottom portion 50 of the first lateral side 18 of the wall 62 of the container 15.

If the seat belt 103 were used (as in FIG. 1) with the orientation presented in FIG. 2 the shoulder portion 106 of seat belt 103 would pass through an open slot grove 90 in the top portion 47 of the rear side 27 of container 15 while the waist portion 109 of seat belt 103 would pass through a rear side 27 proximal open slot groove 86, and a distal open slot groove 87.

In one embodiment, the hollow container 15 has a shape of a cuboid (six (6) rectangular sides). The container 15 has first and second lateral sides 18, 21, the front side 24, the rear side 27, the bottom side 33, and the opening in the top 30. The lateral sides 18, 21, the front and rear sides 24, 27 run along the longitudinal axis 35 of the container 15. The bottom side 33 and the opening in the top 30 are in a plane that is orthogonal to the longitudinal axis 35. The bottom side 33 comprises a recessed groove 34 that runs long the perimeter of the bottom side 33, enabling the container 15 to be vertically stackable because the bottom side 33 may be inserted into the opening 30 of another container. The recessed groove 34 is located at the ends of the bottom portions 50, 53 of the first and second lateral sides 18, 21, the bottom portion 56 of the front side 24, and the bottom portion 59 of the rear side 27 of the wall 62 of the container 15. The top portions 38, 41 of the first and second lateral sides 18, 21, a top portion 44 of the front side 24, and a top portion 47 of the rear side 27, are defined as being adjacent to the top portions 38, 41 of the first and second lateral sides 18, 21, the top portion 44 of the front side 24, and the top portion 47 of the rear side 27, respectively. The bottom portions 50, 53 of the first and second lateral sides 18, 21, the bottom portion 56 of the front side 24, and the bottom portion 59 of the rear side 27 are defined as being adjacent to the bottom portions 50, 53 of the first and second lateral sides 18, 21, the bottom portion 56 of the front side 24, and the bottom portion 59 of the rear side 27, respectively. The pair of wheels 118 may be operably coupled to the bottom portion 50 of the first lateral side 18 of the wall 62 of the container 15.

Figure 2B:
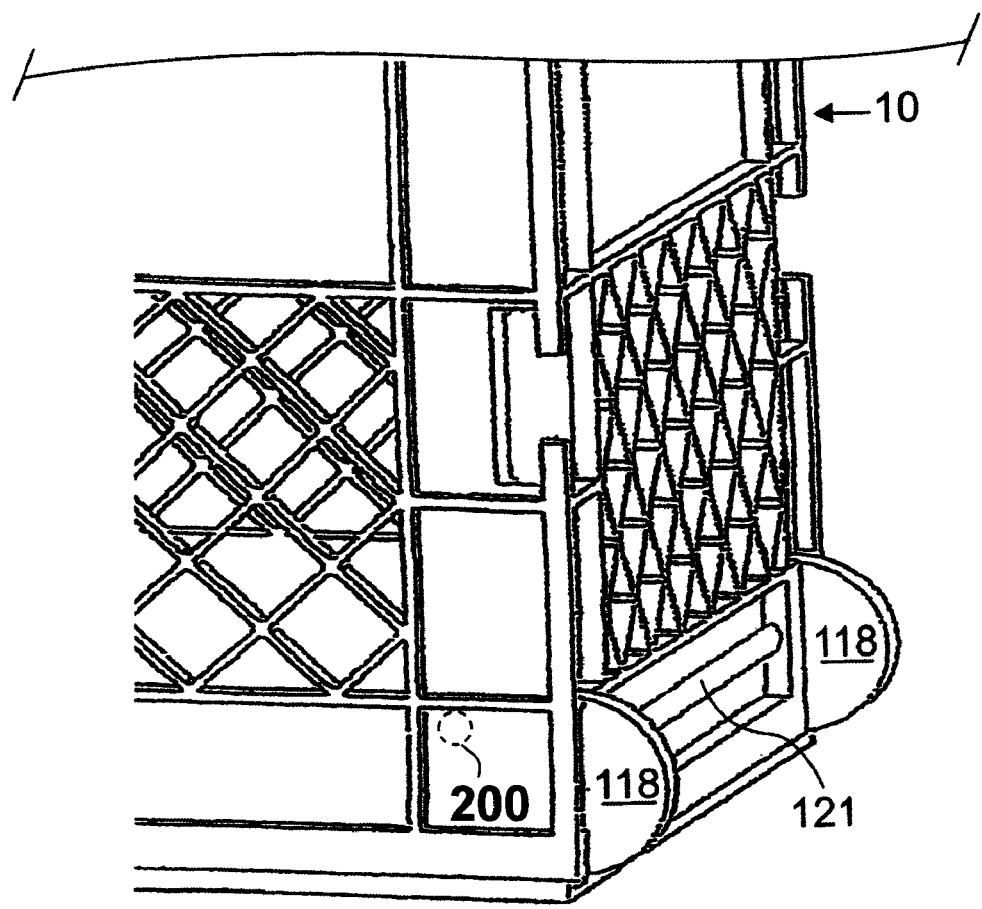
FIG. 2B depicts a view of the wheels operably coupled to the bottom portions of the first lateral side and the axle that operably couples the wheels, in accordance with embodiments of the present invention.

FIG. 2B depicts a view of the wheels 118 operably coupled to the bottom portions 50 of the first lateral side 18 and an axle that operably couples the wheels 118, in accordance with embodiments of the present invention.

In one embodiment an operable coupler 121 that couples the wheels 118 to the bottom portion 50 of the first lateral side 18 of the wall 62 of the container 15 is the axle, recessed in the wall 62.

In another embodiment the wheels 118 insert into open slot grooves 135 in the bottom portion 53 of the second lateral sides 21 of the wall 62 of the container 15.

Figure 2C:
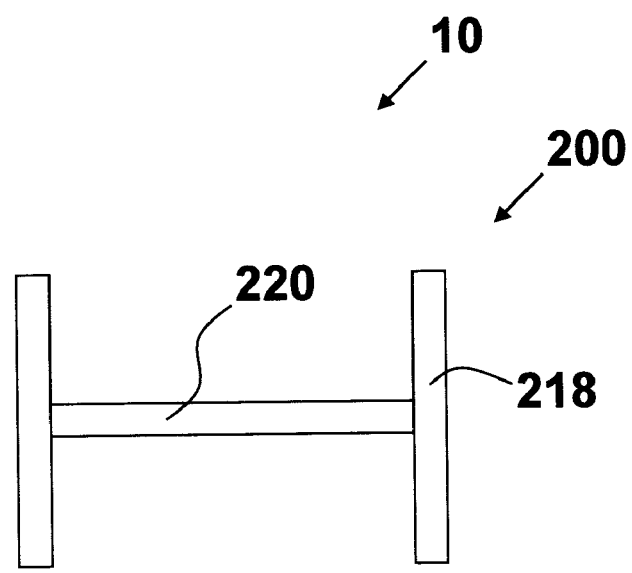
FIG. 2C depicts an exploded cross-sectional view of a travel accessory, in accordance with embodiments of the present invention.

Alternatively, FIG. 2C depicts an exploded cross-sectional view of a travel accessory 200 comprising an elongated member 220 operably and removably coupled to slidable end pieces 218. The elongated member 220 may be an axle and the slidable end pieces 218 may be advantageously balloon wheels, or skis for transporting the container 15 across a sandy beach or snow and ice. The travel accessory 200 may be operably coupled to the bottom portions 56, 59 of the front and rear proximal edges 65, 68 of the first lateral side 18 and the front and rear sides 24, 27 of the wall 62 of the container 15 by removing one of the slidable end pieces 218 and inserting the exposed end of the elongated member 220 into the bottom portions 56, 59 of the front and rear proximal edges 65, 68 of the first lateral side 18 and the front and rear sides 24, 27 of the wall 62 of the container 15.

FIG. 3 and FIG. 9 depict one embodiment of a handle 133 which can be operably attached to the first lateral side 18.

In an embodiment the wheels 118 and the handle 133 are operably coupled to the first lateral side 18 of the wall 62 of the container 15.

In another embodiment the handle 133 is made from material selected from the group consisting of plastic material or fabric, non-metallic material, and non-conductive material.

In one embodiment the handle 133 is selected from the group consisting of a sleeves 133A of a telescopic handle.

In an embodiment the handle 133 is operably coupled to the first lateral sides 18. In one embodiment operably coupling 121 the pair of wheels 118 to an axle that is recessed into the bottom portion 50 of the first lateral side 18 of the wall 62 of the container 15; and operably coupling a handle 133 to the first lateral side 18 of the wall 62 of the container 15; and pulling the handle 133 to apply a pulling force to the first lateral side 18 of the wall 62 of the container 15, so that the container 15 is transported across a surface such as a sidewalk or beach by rolling the wheels 118 over the surface.

Figure 4:
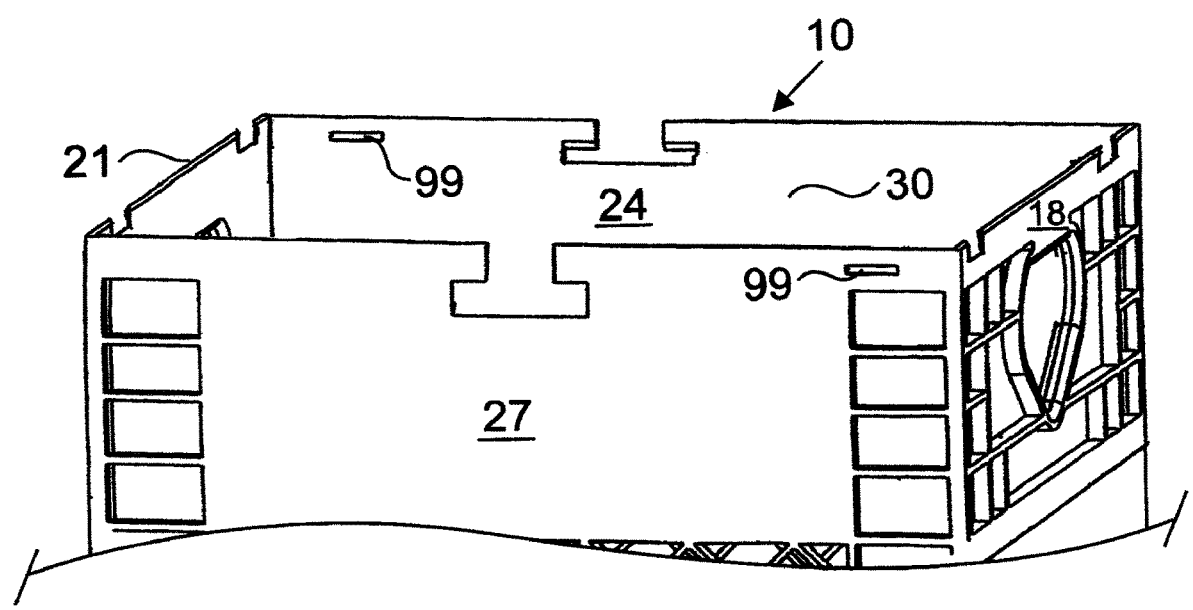
FIG. 4 depicts an elevation view of the material transport cage, in accordance with embodiments of the present invention.

FIG. 4 depicts an elevation view of the material transport cage apparatus 10, in accordance with embodiments of the present invention.

FIG. 5A depicts the apparatus 10 vertically stacked and an open slot groove 130 in the first lateral side 18 and an open slot groove 131 in the second lateral side 21, in accordance with embodiments of the present invention.

In one embodiment the stackable apparatus 10 for storing or transporting at least one cylinder 12 with the wheels 118 insert into open slot grooves 130, 131 into the top portions 38, 41 of the first lateral side 18 and second lateral side 21 of the wall 62 of the container 15 when the containers 15 are vertically stacked.

In another embodiment the perimeter around the bottom portions 50, 53, 56, and 59 is less than a perimeter around the top portions 38, 41, 44, and 47 so the containers 15 are vertically stackable.

In another embodiment a method of transporting at least one cylinder 12 comprises providing a plurality of containers 15. A perimeter around the bottom portions 50, 53, 56, 59 is less than a perimeter around the top portions 38, 41, 44, 47 so the plurality of containers 15 are vertically stackable; stacking the containers 15 so the wheels 118 insert into the open slot groove 89 in the top portion 38 of the first lateral side 18 of the wall 62 of the container 15 when the plurality of containers 15 are vertically stacked.

In another embodiment the stackable apparatus 10 for storing or transporting at least one cylinder's 12 wheels 118 insert into open slot grooves 130, 131 in the top portions 38 41 of the first lateral side 18 and second lateral side 21 of the wall 62 of the container 15.

FIG. 5A2 depicts the apparatus 10 before being vertically stacked. Motion indicating arrows 160, 163 show the direction of motion.

FIG. 5B2 depicts the apparatus 10 after being vertically stacked.

FIG. 6A depicts the apparatus 10 horizontally stacked.

FIG. 6A2 depicts the apparatus 10 before being horizontally stacked. Motion indicating arrows 166, 169 show the direction of motion.

FIG. 6B2 depicts the apparatus 10 after being horizontally stacked.

FIG. 7 depicts the removable lid 14 and an embodiment of its locking mechanism 100, in accordance with embodiments of the present invention.

In one embodiment the removable lid 14 has a first surface 91 and a second surface 94, which are oppositely facing, wherein a recessed groove 97 forms the perimeter of the second surface 94 facing and adjacent to the top portion 38 of the first lateral side 18 and the top portion 41 of the second lateral side 21, the top portion 44 of the front side 24, and the top portion 47 of the rear side 27 of the container 15, so the second surface 94 facing and adjacent to the top portion 38 of the first lateral side 18 and the top portion 41 of the second lateral side 21, the top portion 44 of the front side 24, and the top portion 47 of the rear side 27 of the container 15 is operably coupled to the top portion 38 of the first lateral side 18 and the top portion 41 of the second lateral side 21, the top portion 44 of the front side 24, and the top portion 47 of the rear side 27 of the container 15.

In one embodiment the removable lid 14 comprises the locking means 100 for operably coupling the lid 14 and the top portion 38 of the first lateral side 18 and the top portion 41 of the second lateral side 21, the top portion 44 of the front side 24, and the top portion 47 of the rear side 27 of the container 15.

In one embodiment the removable lid 14 has oppositely facing first and second surfaces 91 94, wherein a recessed groove 97 forms the perimeter of the second surface 94 facing and adjacent to the top portions 38, 41, 44, 47 of the first and second lateral sides 18, 21, the front side 24, and the rear side 27 respectively, so the second surface 94 facing and adjacent to the top portions 38, 41, 44, 47 of the first and second lateral sides 18 21, the front side 24, and the rear side 27 respectively is operably coupled to the top portions 38, 41 of the first and second lateral sides 18, 21, the front side 24, and the rear side 27, of the wall 62 of the container 15.

In another embodiment the locking means 100 embedded in a recess 98 of the second surface 94 of the lid 14. The locking means 100 comprises a handle 101 and a latch 102. Securing the at least one cylinder 12 in the container 15 by rotating the handle 101 of the locking means 100 so the latch 102 of the locking means 100 engages a closed slot groove 99 in the top portions 44 47 of the front and rear sides 24 27.

FIG. 8 depicts the apparatus 10 with an optional interlocking spacer 139, in accordance with embodiments of the present invention.

In one embodiment the optional interlocking spacers 139 running along a longitudinal axis 35 of the container 15 that are orthogonal to the bottom side 33 of the container 15.

In one embodiment the interlocking spacers 139 running along a longitudinal axis 35 of the container are orthogonal to the bottom side 33 of the container 15 and a plurality of cylinders 12 can be inserted between the spacers 139.

FIG. 10 depicts an elevation view of the apparatus 10, comprising a top container 15A and a bottom container 15B, prior to being vertically stacked, as shown in FIG. 5, and described herein. Both top and bottom containers 15A, 15B have open slot groves 130 in the top portions 38 of the first lateral side 18 into which the wheels 118 of the apparatus 10 may be inserted. In FIG. 10, the wheels 118 are shown being inserted into open slot grooves 130 in the top portions 38 of the first lateral side 18 of the wall 62 of the container 15B, thus forming said vertically stacked containers 15A, 15B. This allows the recessed groove 34 that runs along the perimeter of the bottom side 33 to be securely inserted into the top 30 of another container 15.

FIG. 11 depicts a detailed view of the lid 14 being operably coupled to the top of the apparatus 10. The lid is 14 operably coupled to the top of the apparatus 10. In one embodiment the removable lid 14 has a first surface 91 and a second surface 94, which are oppositely facing, with a recessed groove 97 along the perimeter of the second surface 94. The recessed groove 97 can be operably coupled to the top portion 38 of the first lateral side 18 and the top portion 41 of the second lateral side 21, the top portion 44 of the front side 24, and the top portion 47 of the rear side 27 of the container 15, with the recessed groove 97 providing a secure coupling of the removable lid 14 to the apparatus 10.

In one embodiment the removable lid 14 comprises the locking means 100 for operably coupling the lid 14 and the top portions of two parallel sides, either the top portion 38 of the first lateral side 18 and the top portion 41 of the second lateral side 21, or the top portion 44 of the front side 24, and the top portion 47 of the rear side 27 of the container 15.

In another embodiment the locking means 100 embedded in a recess 98 of the second surface 94 of the lid 14. The locking means 100 comprises a handle 101 and a latch 102. Securing the at least one cylinder 12 in the container 15 by rotating the handle 101 of the locking means 100 so the latch 102 of the locking means 100 engages a closed slot groove 99 in the top portions 44 47 of the front and rear sides 24 27.

In an alternative embodiment, a locking means 55, e.g., a reusable zip tie or the like for operably coupling the lid 14 and the top portions of two parallel sides, either the top portion 38 of the first lateral side 18 and the top portion 41 of the second lateral side 21, or the top portion 44 of the front side 24, and the top portion 47 of the rear side 27 of the container 15. In this embodiment the locking means 55 may be threaded through the closed slot groove 99 in the top portions 44, 47 of the front and rear sides 24, 27 and an opening 57 in the lid 14, resulting in operably coupling the lid 14 to the closed slot groove 99 in the top portions 44, 47 of the front and rear sides 24, 27. The locking means 55 may be held in reserve by threading and locking it in the opening 57 of the lid 14.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A stackable apparatus, comprising:
at least one vertically or horizontally stackable hollow containers (15), each container having the shape of six rectangular sides, each adjacent side forming a right angle where the adjacent sides join, comprising:
first and second lateral sides (18, 21),
wherein a top portion (38) of the first lateral side (18) comprises an open slot groove (130),
wherein a top portion (41) of the second lateral side (21) comprises an open slot groove (131) and a bottom portion (53) of the second lateral side comprises an open slot groove (135);
a front side (24),
wherein a top portion (44) of the front side (24) comprises an open slot groove (89) and a bottom portion (56) of the front side (24) comprises an open slot groove (85) and an open slot groove (88) in the front proximal and front distal edges (65, 71) of a wall (62) of the container (15);
a rear side (27);
wherein a top portion (47) of the rear side (27) comprises an open slot groove (90) and a bottom portion (59) of the rear side (27) comprises an open slot groove (86) in the rear proximal edge (68) and an open slot groove (87) in the rear distal edge 74) of a wall (62) of the container (15); and
a bottom side (33),
wherein the bottom side (33) comprises a recessed groove (34) that runs along the perimeter of the bottom side (33);
an open top (30),
wherein the first and second lateral sides, the front side, and the rear side run along a longitudinal axis of the container,
wherein the bottom side (33) and an opening in the top are each in a plane orthogonal to the longitudinal axis,
wherein adjacent sides of each container are operably coupled to form the wall (62) of the container,
wherein the wall includes front and rear proximal edges and front and rear distal edges, wherein a proximal edge is defined as being closer to a longitudinal axis running along the center of a vehicle (83), by which the container is transported, than a distal edge, wherein the front and rear proximal edges are formed by coupling a first lateral side to the front and rear sides, respectively, and the front and rear distal edges are formed by coupling the second lateral side to the front and rear sides, respectively;

interlocking spacers running along a longitudinal axis of the container that are orthogonal to the bottom side of the container; and at least one cylinder(s) inserted between the spacers;

a removable lid having oppositely facing first and second surfaces, wherein a recessed groove forms the perimeter of the second surface facing and adjacent to the top portions of the first and second lateral sides, the front side, and the rear side respectively, so the second surface facing and adjacent to the top portions of the first and second lateral sides, the front side, and the rear side respectively is operably coupled to the top portions of the first and second lateral sides, the front side, and the rear side, of the wall of the container(s);

a locking means embedded in a recess of the second surface of the lid, wherein the locking means comprises a handle and a latch; and at least one cylinder is secured in the container by rotating the handle of the locking means so the latch of the locking means engages a closed slot groove in the top portions of the front and rear sides.

2. The apparatus of claim 1, comprising:

a pair of wheels operably coupled to an axle that is recessed into the bottom portion of the first lateral side (18) of the wall of the container; and a handle operably coupled to the first lateral side of the wall of the container, so that the container is transported across a surface such as a sidewalk or beach by rolling the wheels over the surface by pulling the handle to apply a pulling force to the first lateral side of the wall of the container.

3. The stackable apparatus of claim 1, comprising:

a travel accessory (200), comprising an elongated member (220) operably and removably coupled to slidable end pieces (218).

4. The stackable apparatus of claim 3, wherein the elongated member (220) may be an axle and the slidable end pieces (218) are selected from the group consisting of balloon wheels, and skis, for transporting the container across a sandy beach or snow and ice.

5. The stackable apparatus of claim 3, comprising:

the travel accessory (200), operably coupled to the bottom portions 56, 59) of the front and rear proximal edges (65, 68) of the first lateral side (18) and the front and rear sides (24, 27) of the wall (62) of the container (15) by removing one of the slidable end pieces (218) and inserting an exposed end of an elongated member (220) into the bottom portions (56, 59) of the front and rear proximal edges (65, 68) of the first lateral side (18) and the front and rear sides (24, 27) of the wall (62) of the container (15).

6. The apparatus of claim 1, wherein the bottom portion (50) of the first lateral side (18) comprises wheels (118), wherein the wheels (118) of one container are insertable into the open slot grooves (130, 131) in the top portion (38) of the first lateral side (18) and the top portion (41) of the second lateral side (21) of another container to achieve secure vertical stacking of the two containers, or wherein the wheels (118) of one container are insertable into the open slot grooves (135) in the bottom portion (53) of the second lateral side (21) to achieve secure horizontal stacking of the two containers.

\* \* \* \* \*